United States Patent [19]
Duncan et al.

[11] Patent Number: 4,870,863
[45] Date of Patent: Oct. 3, 1989

[54] MODULAR SWITCH DEVICE

[75] Inventors: William M. Duncan; George E. Glass, both of Asheville; Jeffrey L. Johnson; Edward A. McMillan, both of Fletcher; Frank S. Maney, Waynesville; James R. McConnell, Jr., Arden; Kenneth P. Roberts; Timothy R. Sanders, both of Asheville, all of N.C.

[73] Assignee: Square D Company, Palatine, Ill.

[21] Appl. No.: 98,360

[22] Filed: Sep. 17, 1987

[51] Int. Cl.[4] .................... G01D 21/02; G01D 21/00; G01K 1/02; G01L 19/12
[52] U.S. Cl. .................... 73/431; 73/866.1; 73/714; 200/56 R; 307/112; 361/394; 361/395; 364/571.04; 374/141; 374/143
[58] Field of Search .............. 73/1 R, 4 R, 431, 866.1, 73/866.3, 714; 364/571.01, 571.04; 361/392, 393, 394, 395, 396; 200/56 R; 307/112, 117, 118; 377/19, 25; 374/1, 141, 143

[56] References Cited

U.S. PATENT DOCUMENTS

| | | | |
|---|---|---|---|
| 3,997,819 | 12/1976 | Eggert et al. | 361/394 X |
| 4,114,448 | 9/1978 | Merritt | 73/714 X |
| 4,136,561 | 1/1979 | Mueller et al. | 361/393 X |
| 4,251,853 | 2/1981 | Sites | 361/395 X |
| 4,434,132 | 2/1984 | Cook | 376/259 |
| 4,446,715 | 5/1984 | Bailey | 73/1 R |
| 4,483,178 | 11/1984 | Millie | 73/1 R |
| 4,633,422 | 12/1986 | Brauer | 73/1 R X |
| 4,669,052 | 5/1987 | Bianco | 73/1 R X |
| 4,680,674 | 7/1987 | Moore | 361/396 X |
| 4,739,325 | 4/1988 | MacLeod | 324/342 X |
| 4,753,105 | 6/1988 | Juanarena et al. | 73/4 R |
| 4,782,245 | 11/1988 | Henry | 307/112 X |

FOREIGN PATENT DOCUMENTS

| | | | |
|---|---|---|---|
| 132152 | 1/1985 | European Pat. Off. | 361/393 |
| 2543781 | 10/1984 | France | 361/394 |
| 456319 | 3/1975 | U.S.S.R. | 307/117 |

OTHER PUBLICATIONS

"Control Master-Digital Process Monitor/Controller", brochure of Industrial Technology Group, pp. 1-4, pub. by Jan. 1989.
"Programmable Sensor Controller-S3D8", brochure of Omron Electronics, Inc., printed 5/87, pp. 1-8.
"PM-5050Intellignet Process Monitor/Meter", product data sheet of GE-DATEL, printed 2/87, pp. 1-6.
"PDS 2001 Microprocessor-based temperature Controller", brochure of Chromalox Instruments and Controls Division of Emerson Electric Co., printed 2/86, pp. 1-4.
"'Smart' Pressure Transducer Simplifies, Upgrades Control Systems", Design News Nov. 3, 1986 issue, pp. 86, 87 & 89.

(List continued on next page.)

Primary Examiner—Tom Noland
Attorney, Agent, or Firm—James Earl Lowe, Jr.; Jose W. Jimenez; A. Sidney Johnston

[57] ABSTRACT

A modular switch device includes a housing enclosing an interconnected control module, a display module and a power module. A sensor module supplying analog data signals from one of a temperature or pressure sensing element connects to the control module through a passage in the housing. A user connects his electrical wires and electrical power to the electrical assembly within the housing through an opening. The user can select between AC and DC switched output modules and the presence or absence of a 4-20 milliampere output module by plugging and unplugging same from wells provided in the housing. The manufacturer and user thus can modify the standard housing, which includes an internal electrical assembly to be a pressure or temperature switch and to provide selected output switch characteristics by applying and removing selected sensor and output modules thereto. The interconnection between the sensor module and the control module includes particular leads carrying analog data signals and serial digital information signals. The control module includes one analog to digital converter and control means in the form of a microprocessor.

22 Claims, 13 Drawing Sheets

OTHER PUBLICATIONS

"New Solid-State Pressure Switches", brochure of Barksdale Control Div. of Transamerica Delaval Inc. Bulletin No. 830314, 1983, pp. 1-4.

"REX-C72 Series-MF-72 Series", brochure of Syscon International, Inc., 1968, pp. 1-4.

"Minicor ND Controller", brochure of Star Controls, Inc., printed 2/87, pp. 1-2.

"Microcor III Universal Controller", brochure of Compagnie de Regulation et de Controle Industriel, pp. 1-4; published by 1/1989.

"Digital Process Indicators for Millivolt, Voltage and Current Transducers", pp. D-11 through D-14; pub. by 1-1989.

"Programmable Temperature Controller-Model 7030", brochure of EG & G Chandler Engineering, 2 pp., pub. by 1-1989.

"Series 4500-Digital Panel Instruments 2046-INI", brochure of LFE Instruments Division, pp. 1-2, pub. by 1-1989.

"Series 4500-Digital Panel Instruments 2045-SB2", brochure of LFE Instruments Division, pp. 1-4, pub. by 1-1989.

"MIC 2000-1/4 DIN Microbased Process Control", brochure of Partlow Process Instrumentation, pub. by 1-1989.

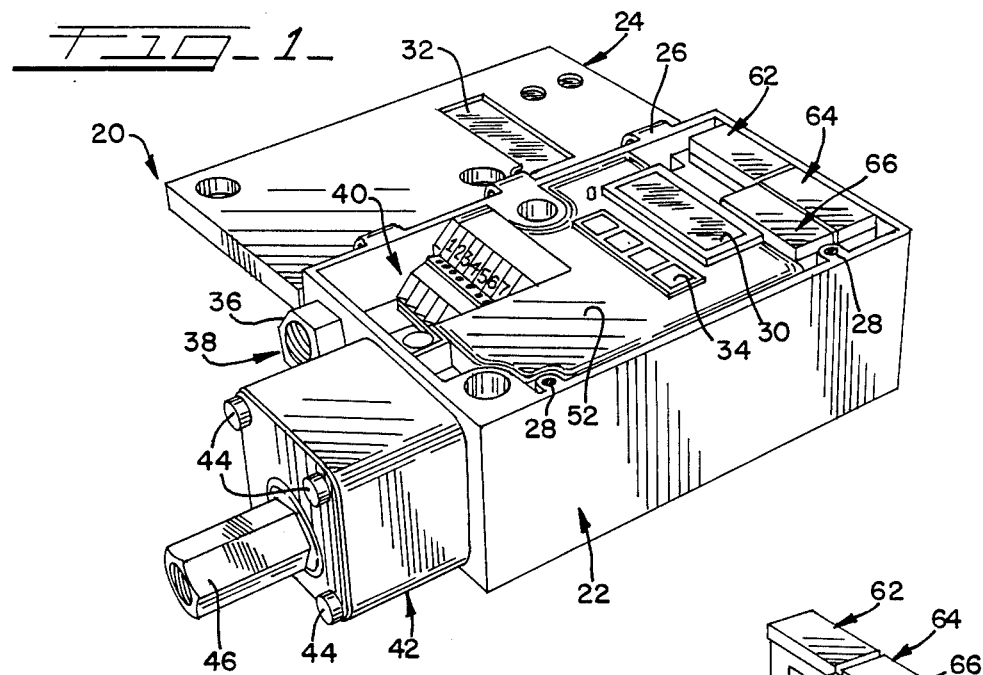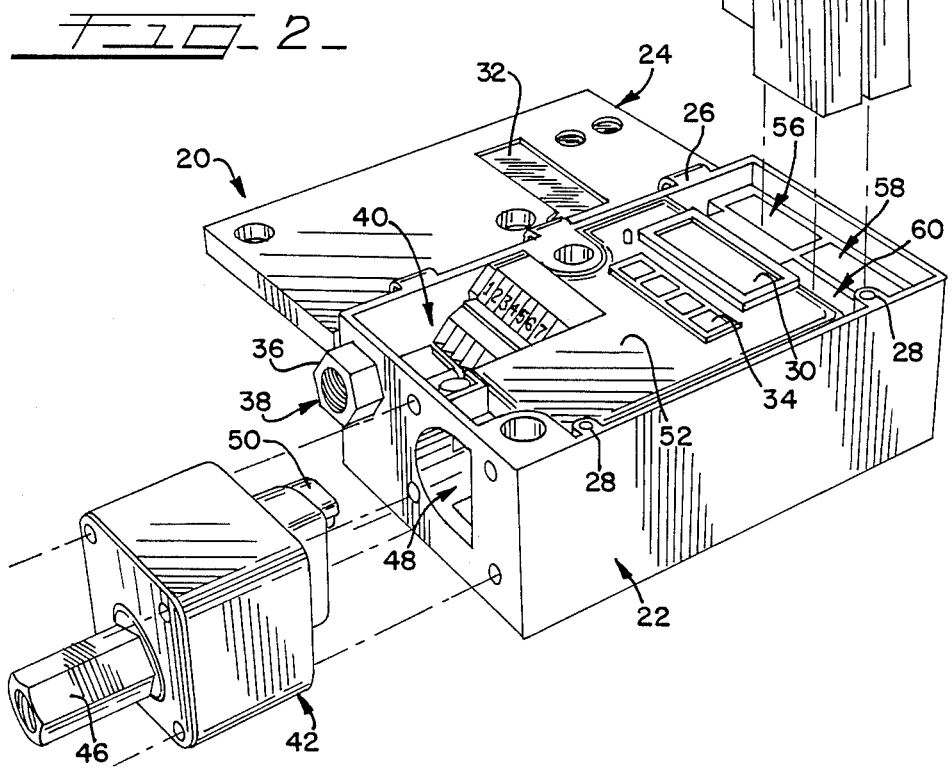

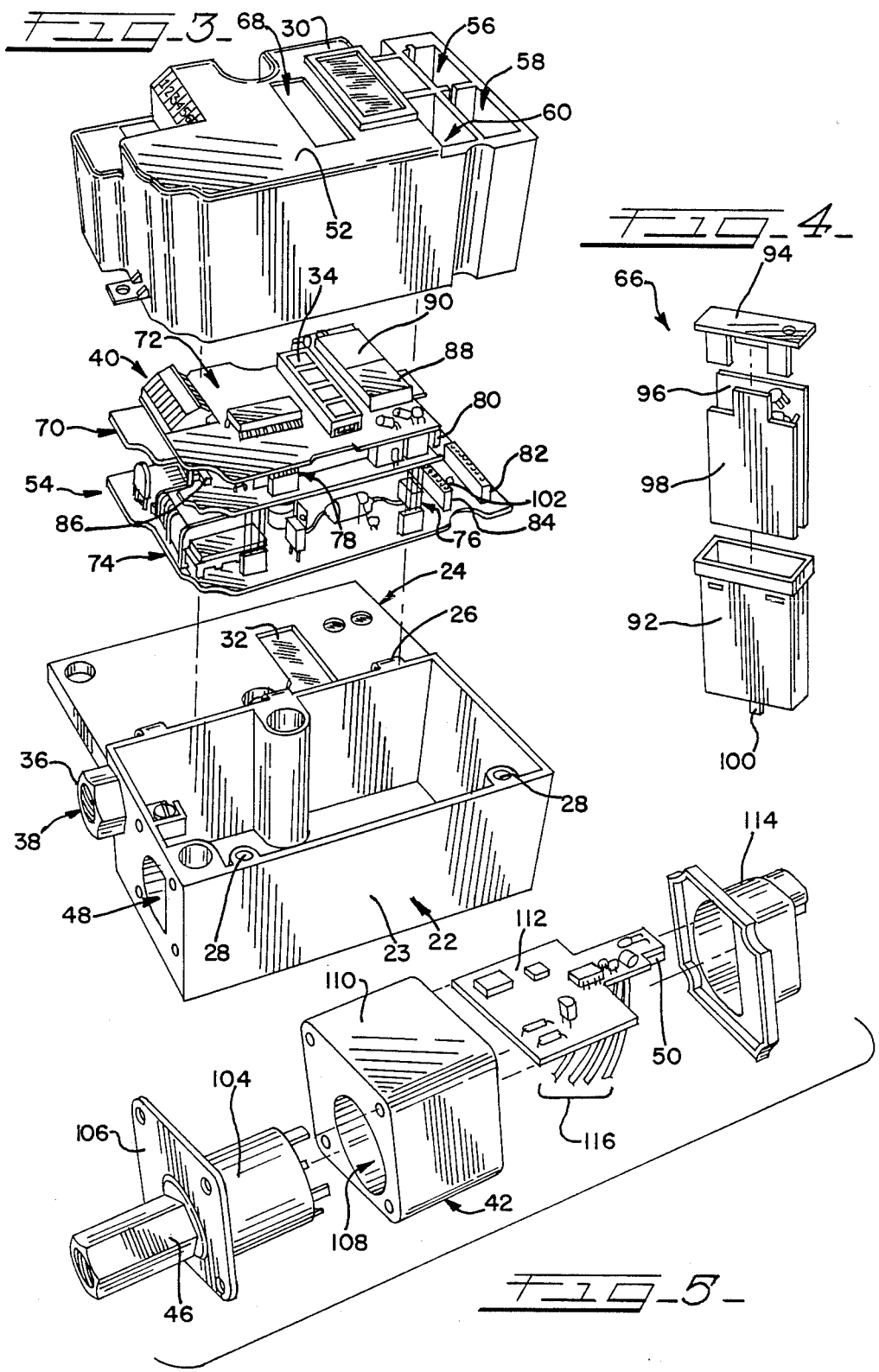

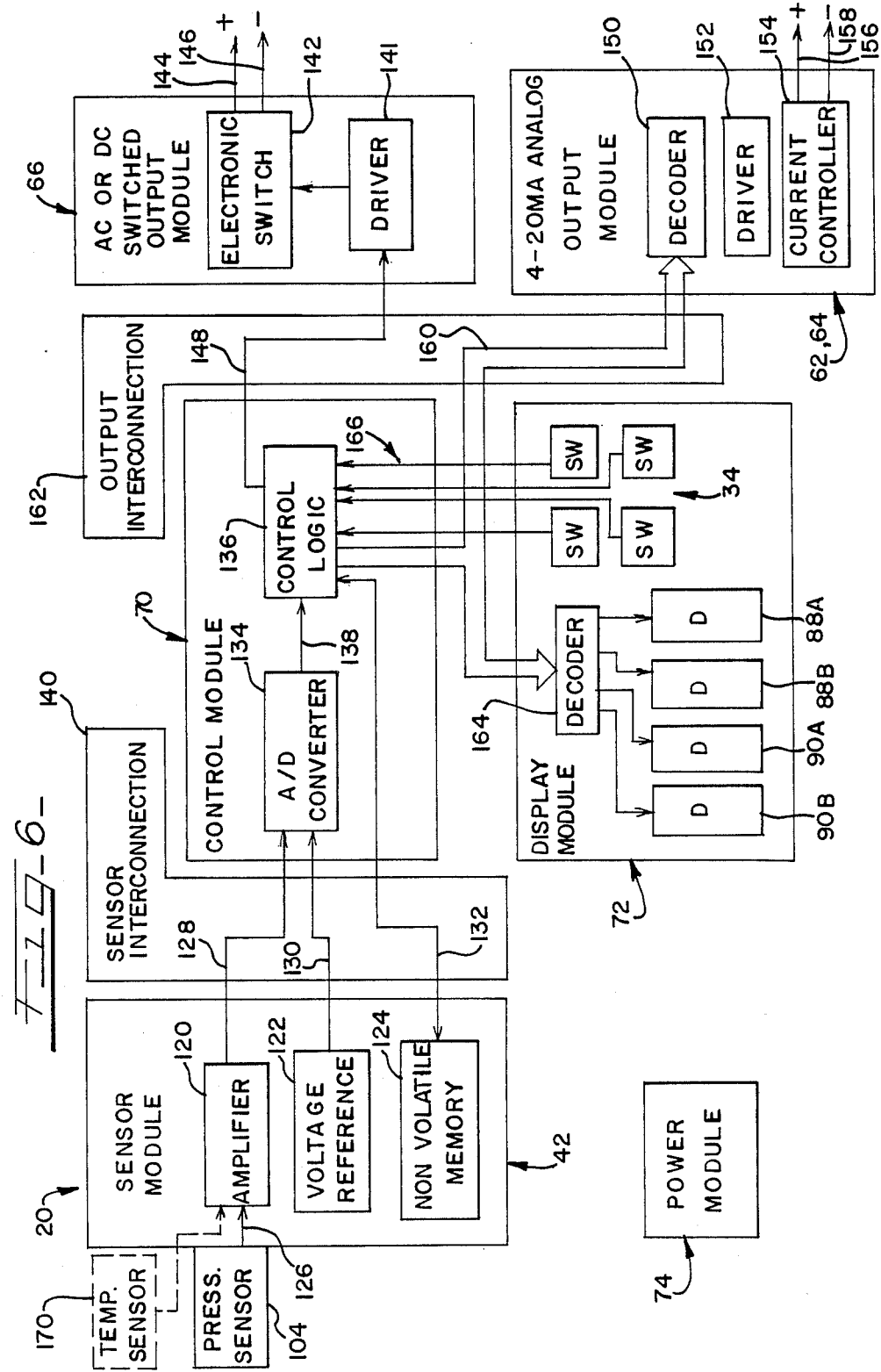

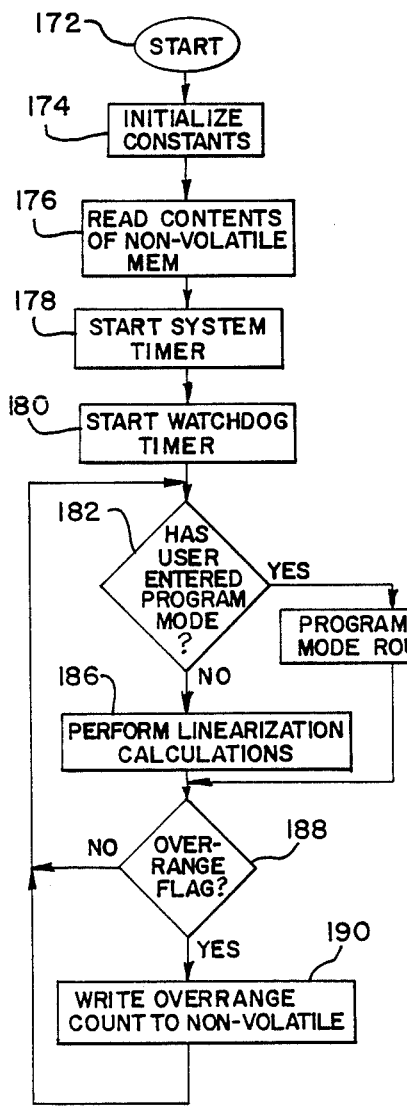
FIG_7_
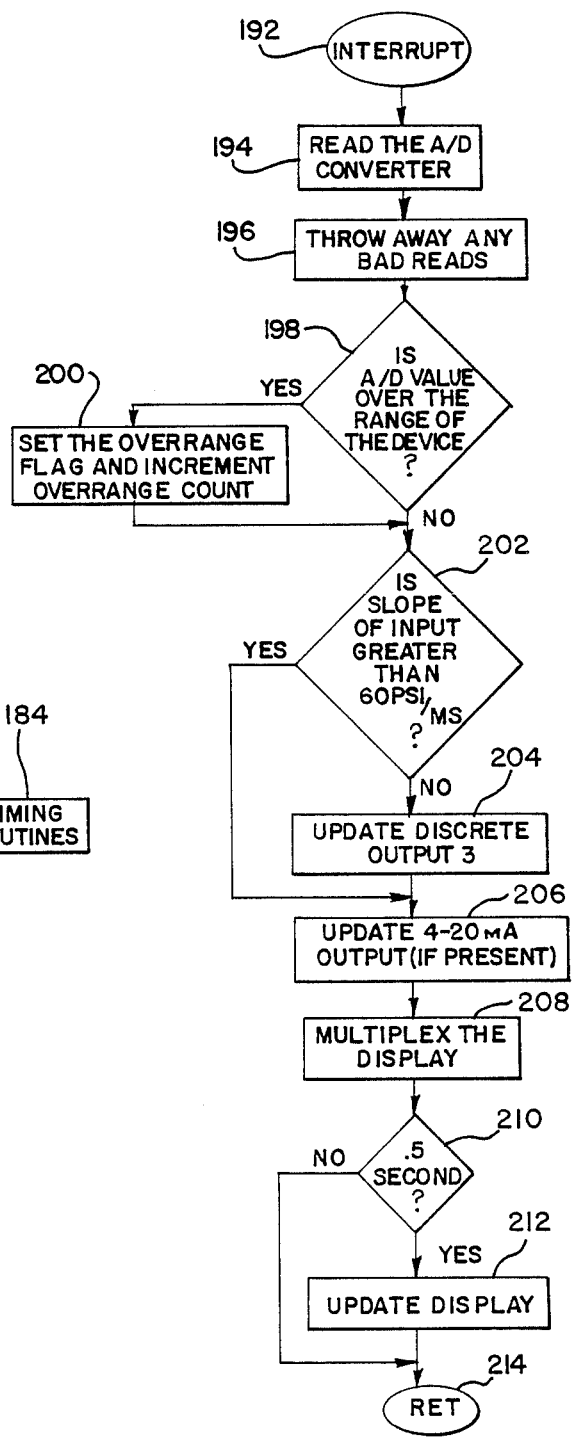
FIG_8_

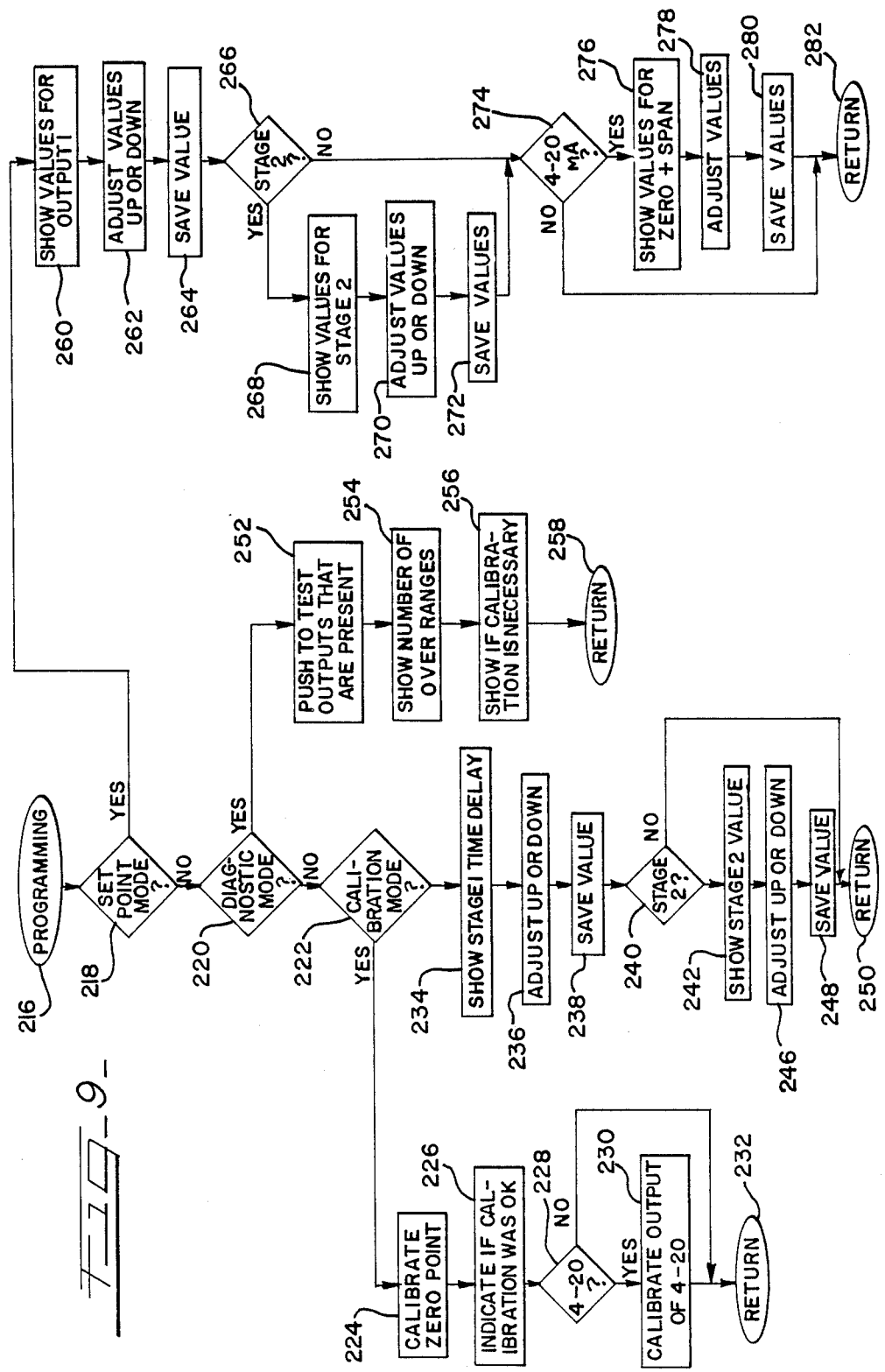

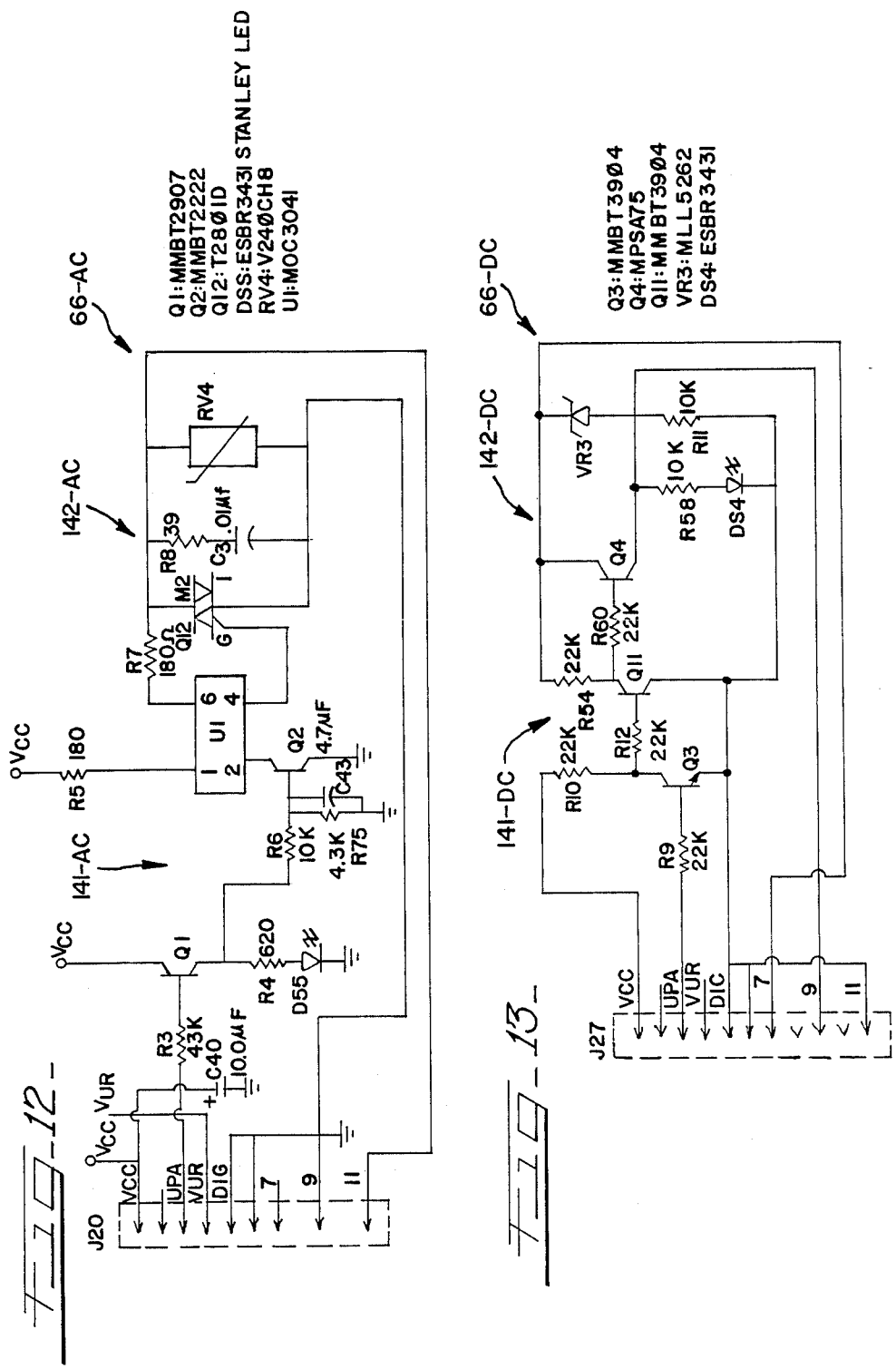

FIG-16-

MODULAR SWITCH DEVICE

BACKGROUND OF THE INVENTION

This invention relates generally to switch devices that furnish discrete output signals as a pressure or temperature sensitive element experiences or senses a set point or particular value and to sensor devices that furnish continuous or analog outputs, indicating the pressure or temperature conditions experienced or sensed by a sensing element. In particular, the invention relates to a modular switch device that includes selected removable and interchangeable output modules furnishing desired discrete and analog output signals, indicating the pressure and temperature conditions experienced by a sensing element associated with a selected one of several removable and interchangeable sensor modules Pressure switches are known that include an integral pressure sensing element connected to a pressure line. The output of the pressure switch indicates that the pressure in the pressure line stands above or below a selected set point or particular value by making or breaking contact between pairs of user-supplied wires. Temperature switches likewise are available to provide similar indications on user-supplied wires in response to sensed temperatures being above or below selected set points or particular values.

Such switches become used in such as industrial applications for controlling processes involving pressure and temperature. While these switch devices have in the past substantially fulfilled the requirements for indicating process parameters, they exhibit some drawbacks. In particular, the switch devices generally have been limited by the accuracy of the included sensing element. A more accurate pressure or temperature switch device required a more accurate and more expensive sensing element and a more accurate electrical circuit for converting the sensed pressure and temperature to the desired opening and closing of contacts for the output. If the range or type of switch device in its entirety was to be changed in the field, the old temperature or pressure switch device was removed and discarded and the new desired switch device was installed. This effected needless waste of an otherwise properly functioning switch device.

Additionally, pressure sensing elements usually provide a non-linear data signal to the control electronics of the switch device. This nonlinearity previously became compensated or adjusted for by the control electronics before the device determined whether to change or maintain the condition of the output contacts. Normally, the sensing element data signal occurs at a low level and must be amplified for use by the control electronics. This introduces amplifier gain and drift and accuracy errors that can differ between different ones of the switch devices.

Pressure transducers, at least, have become known that include micro-electronic processors enclosed within the cylindrical case of the transducer. These transducers compensate for these non-linearities and different gain to provide a serial data signal indicating the pressure sensed by the pressure sensing element of the transducer. This overcomes some of the drawbacks of earlier switch devices, but again the entire case and contents becomes discarded when replaced by a switch device of a different range or of a different type, whether pressure or temperature.

The transducer calibration system disclosed in U.S. Pat. No. 4,446,715 to Bailey furnishes a transducer system capable of receiving data signals from a plurality of pressure transducers and that provides plural corresponding monitoring and correcting circuits to furnish a fully corrected pressure measurement output signal from each transducer.

The pressure transducers comprise a fiber optic pressure sensing element and a circuit card carrying opto-electronic signal producing components and an array of resistors. The resistors in the array identify the offset in the sensing element's output signal at zero pressure, the difference between the span of the sensing elements actual output signal and the span of its desired output signal and the degree of non-linearity in the sensing element's output signal.

The monitoring and correcting circuitry receives the data signal from the sensing element and can determine the resistance of the resistors in the array for correcting and compensating the sensing element to linear data. While the sensor elements or pressure transducers apparently can be connected to the monitoring and correcting circuitry as desired to obtain sensing of different pressure ranges, there is only one analog output, and the monitoring and correcting circuitry includes complicated compensation circuits. This system appears incapable, further, of accepting a temperature transducer in place of a pressure transducer.

The pneumatic-digital converter system and method disclosed in U.S. Pat. No. 4,483,178 to Mille furnishes a pressure to digital module assembly. A chassis of the system carries a plurality of pressure line connectors for the pressure lines to be monitored and carries a printed circuit mother board carrying a plurality of electrical connectors for receiving the digital data measured from the monitored pressure lines. Modules plug into the chassis and mother board for connection to the pressure lines and conductors carried on the mother board. Each module contains one or more pressure transducers, an analog to digital converter and a non-volatile memory component, which stores data to compensate for nonlinearities, offsets, gains, etc. of the transducer and converter. Each module also contains a temperature transducer to sense the ambient temperature for correcting temperature variations in the pressure transducers. Changing the range of a pressure sensing element or changing to a temperature sensing module apparently requires discarding the entire module including the non-volatile memory, the analog to digital converter and control logic.

In the temperature type switch devices, it is known to provide a process monitor or meter that provides terminals for electrical connection to any one of several different types of thermocouples having different temperature ranges. These devices contain control logic and non-volatile memories to linearize the input signal depending upon the thermocouple type used. Switched and analog outputs are available apparently as factory options while some types of switch devices allow the user to change the type of output by simply changing an output circuit card. This later change becomes effected by removing the housing of the meter, sliding the output circuit board off the stakes connecting it to the control logic circuit board and installing the desired output circuit board. While the ability to change the type of outputs and the type of temperature sensors appears readily accomplished by such a device, such a switch device cannot readily be changed to sense and indicate pressures.

General purpose digital process monitors or controllers also are known to accept any one of two different types of sensing element data signals and to provide serial, discrete and analog outputs. Microprocessor based software performs wide ranges of mathematical operations on the data received from the sensing elements to perform desired linearization, scaling and range outputs. While such switch devices perform most switching functions conceivable, their expense prohibits them from being used in ordinary process control situations. Moreover, field changes appear to require opening the case of the switch device to interchange internal circuit boards.

What is desired is a switch device having a standard housing and standard, interchangeable sensor and output modules that serve well for processing pressure and temperature data from respective sensing elements and that can supply desired switched and analog outputs. Such a switch device could be manufactured with few differing parts to provide temperature and pressure sensing over wide ranges. This would simplify manufacturing to make specific ones of standard parts and to combine desired sensor and output modules with a standard housing assembly at final assembly to meet custom orders. In the field, customers could readily change between temperature or pressure ranges, between temperature and pressure sensing, and between desired outputs simply by removing and installing desired modules from exterior of the switch device housing.

Such a switch device could be manufactured inexpensively, and once installed in a customer's plant, could be changed as desired to meet changing process control needs. Such a switch, however, should be arranged and constructed for each sensing device to provide the most accurate data possible between manufacturing lots of the sensing elements of the same type and range.

SUMMARY OF THE INVENTION

The switch device of the invention provides a standard housing assembly capable of receiving from its exterior pluggable sensor and output modules. Different temperature and pressure sensor modules are interchangeable and different output modules are interchangeable. The housing assembly includes a protective case and an electronic assembly including an analog to digital converter and control logic standard to all sensor and output module variations. The sensor modules each contain digital calibration data used to standardize and linearize the data signals produced by each different sensor module. A standard input port of serial and analog signals to the housing assembly receives the various temperature and pressure sensor modules. The output modules likewise become installed at standard output ports with each type of output module being indicated by a simple wiring of an indicator lead and the output module connector.

The processes of the invention includes a self-diagnostic tool that accumulates the number of times a sensor experiences an over-range condition and displays or indicates the over-range count to the user upon demand. Transients, in such as a sensed pressure line, become digitally filtered out by determining the slope of successive data signal values and ignoring those with a slope greater than a certain value. The switch device further indicates that the calibration data for recalibrating the sensing element to zero needs to be reset and prevents any recalibration beyond one percent of the previous value.

The switch device indicates on a display the calibrated set points or particular values at which the output modules are to make and break contact between the user-supplied wires. A user changes the displayed particular values by actuating push button switches binarily to increment or decrement the contents of a register containing the actual values from the sensor module at which making and breaking of contact is to occur. The switch device then converts the contents of that register to produce the linearized or calibrated switch point selected by the user at the display.

Thereafter, the control logic only compares the received data signal from the sensor module against the actual values in the registers to determine whether to make and break contact at the output modules.

The switch device of the invention thus provides a standard housing assembly that can be used to make several different desired temperature or pressure switch devices. The manufacturer produces standard parts such as housing assemblies, sensor modules and output modules. Each sensor module is tested by the manufacturer for its linearity, offset and gain, and the data for standardizing the calibration of that sensor module becomes written into a non-volatile memory carried therein. At final assembly, the manufacturer installs the sensor and output modules specified by the customer before shipping the switch device to the customer.

In the field, the user changes between temperature or pressure ranges, between pressure or temperature sensors or between output types by unplugging from the exterior of the switch device housing the undesired sensor or output module and plugging in the desired module. The modules are small and relatively inexpensive to reduce the waste if the modules are discarded, or the customer can retain the modules for later use in the same or other switch devices. This substantially reduces the amount of labor and materials the user must spend to effect a change of the switch device while reducing to a minimum the manufacturing and assembly costs.

In particular, the modular switch device comprises a cast metal housing with a hinged front door that can seal the interior of the housing from the environment. An opening in the housing admits electrical wires from the user, and a passage in the housing furnishes connection to externally mounted sensor modules. An inner plastic case covers the internal electronic circuitry when the hinged plate of the housing becomes opened and provides three output module ports or wells intended to receive the output modules.

The sensor module comprises an outer case or housing that becomes attached to the standard housing assembly by such as bolts with a connector extending through the passage for connection to electrical circuits inside the housing assembly. The output modules comprise rectangular cases having connectors along an edge of an internal circuit board to be inserted into a connector extending into the bottom of each port or well. Thus by simple translational force, a user can remove the output modules from the modular switch device. By removing four bolts, the user likewise can remove the sensor module from the modular switch device.

Inside the standard housing assembly, the switch device contains three circuit boards arranged above and below one another so that from the bottom up they respectively provide the power supply module, the control module comprising an analog to digital converter and control logic and the display module presenting a visual display and user accessible switches. This electronics group or assembly becomes manufactured identical for every modular switch device.

The two different types of output modules that provide AC and DC switching each comprise the described rectangular case with snap-fit cover, a small enclosed circuit board, and if desired or necessary, a heat sink formed by an enclosed sheet of metal such as aluminum. The output module for the analog output signal comprises two such plastic cases with covers substantially enclosing a single circuit board extending therebetween carrying the necessary electronic components.

A sensor module comprises the described outer housing or base, enclosed circuit board carrying the connectors to the sensor and control module, an amplifier circuit, a voltage reference circuit and a non-volatile memory component. A snap-fit end casing or cover substantially prevents user intrusion to inside the sensor module while providing a passage therethrough for connection of the enclosed circuit board to the housing assembly.

The interconnection between a sensor module and the electronics or control module within the housing assembly comprises a first lead carrying the amplified analog data signal originating at the sensing element and carrying the temperature or pressure information. Second and third leads carry separate, uni-directional serial digital data between the control module and sensor module to convey calibration signals and set point or particular values between the two modules. A fourth lead extending from the control module to the sensor module carries a clock signal indicating the serial bit timing in the serial digital data. An additional lead provides a reference voltage produced on the sensor module to the control module for aiding the control module to effect the analog to digital conversion. This interconnection also includes power leads and a chip select lead for the non-volatile memory.

The process of indicating the number of times that the temperature or pressure sensing element experiences an over-range condition comprises receiving a datum value from the sensing element, testing the datum value to determine whether it is over the range of the sensing element by comparing it to the maximum calibration datum from the nonvolatile memory in the sensor module and incrementing an over-range counter if the received data value is greater than the maximum calibration datum. The process then writes the incremented over-range counter to a storage location in the memory component and indicates the count of the over-range counter upon demand of the user. This indication can occur by visual display.

Transient changes in the sensed temperature or pressure lines become recognized and eliminated by the switch device of the invention by receiving data from the sensor module. Each datum then becomes compared to the previous drum to determine whether the slope of the data is greater than a certain value, which represents a maximum desired transient response. Upon the slope of the data being greater than said certain value, the process of the invention obtains additional data and analyzes its slope. When the slope of the data becomes equal to or less than the certain value, the switch device proceeds to effect the making and breaking of contact of the user-supplied electrical wires.

The switch device of the invention indicates to a user that the data from the sensing element needs to be recalibrated to a zero level. This recalibration occurs by the user placing a zero load on the sensing device and indicating to the device that the sensor is to be recalibrated to zero and that the sensing element is experiencing a zero level load. The switch device then reads the data signal from the sensing element to obtain a new zero-level value and determines whether the new zero-level value is within a certain percentage of the old zero-level value. If the new zero-level value is within the certain percentage of the old zero-level value, the device replaces the old zero-level value with the new zero-level value and, if not, indicates to the user that the sensor cannot be recalibrated to zero by the device. Typically, this certain value is one percent. This prevents a user from intentionally or accidentally improperly resetting the zero calibration level of the switch device.

The set point particular values indicated on the four-digit display and selected by the user correspond to the actual data values received from the sensing elements at which the AC or DC discrete output modules make and break contact between the electrical wires supplied by the user. To select or change the set points, the user increments or decrements, by actuating push button switches, the contents of a binary register containing the binary actual value at which the output modules are to change between making and breaking contact. The switch device of the invention immediately upon a change in the contents of the register or actual value performs a linearization or calibration calculation to determine the calibrated value selected by the user, and the switch device indicates the calibrated value on the display. The several different calibrated actual values selected by the user then become stored in the non-volatile memory carried in the sensor module. During operation, the switch device obtains data from the sensing element and compares it to the stored actual values rather than the user selected particular values in determining whether to make and break contact between the electrical wires from the user.

BRIEF DESCRIPTION OF THE DRAWING

FIG. 1 is a perspective view of the switch device of the invention with the front cover opened to reveal the inner case;

FIG. 2 is an exploded perspective view of the switch device of the invention with three output modules spaced from the inner case and the sensor module spaced from the outer housing;

FIG. 3 is an exploded perspective view of the housing assembly showing the outer housing, the inner case and the contained electronics assembly;

FIG. 4 is an exploded perspective view of an output module showing the outer case, top cover, circuit board and heat sink;

FIG. 5 is an exploded perspective view of a pressure sensor module showing the pressure sensor, outer housing, inner case, and enclosed circuit board;

FIG. 6 is a block diagram of the several parts of the switch device of the invention;

FIG. 7 is a flow chart of the main program loop;

FIG. 8 is a flow chart of the interrupt routine servicing the data acquisition, over-range, transient discrimination and display multiplexing features of the switch device;

FIG. 9 is a flow chart of the programming mode routines;

FIG. 12 is a schematic diagram of the electronic components carried in an AC output module;

FIG. 13 is a schematic diagram of the electronic components contained in a DC output module;

DESCRIPTION OF THE PREFERRED EMBODIMENT

Figure 10:
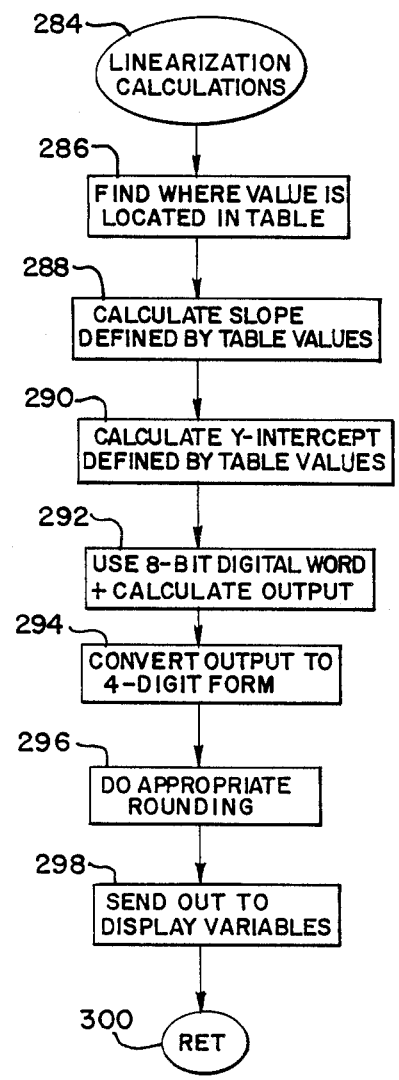
FIG. 10 is a flow chart of the linearization calculations performed by the switch device.

In FIGS. 1, 2 and 3, switch device 20 of the invention presents a housing assembly 22 comprising a rectangular rugged outer housing 23 that is closed by a faceplate 24. Faceplate 24 pivots about hinges 26 to close the open face of the housing 23 and becomes sealed thereto by fasteners passing into threaded openings 28. The switch device typically become mounted vertically with the faceplate accessible by a user to read the information produced at a visual display 30 through a window 32. The user, upon opening the faceplate 24, can input information to the switch device through a set of four switches 34.

The user typically connects his electrical wires (not shown) to the switch device 20 through conduit tube (not shown) connected to the nut fastener 36, which in part provides an opening 38 through the housing 23 so that electrical wires can be connected to terminals 40. Thus user-provided electrical wires carrying electrical power and analog switched signals become connected to the switch device 20 through opening 38 and at terminals 40.

Switch device 20, as shown in the figures, stands constructed and arranged with a pressure sensor module 42 secured to the outer housing 23 by fasteners such as bolts 44. Pressure sensor module 42 connects to a pressure line (not shown) through a connecting nut 46 and connects to the electronic assembly interior of the outer housing 23 through a passage 48 by way of a connector 50 extending from the pressure sensor module 42.

Referring particularly to FIG. 3, the housing assembly 22 comprises an inner case 52 and electronics assembly 54 that fits within the bottom opening chamber of inner case 52 with case 52 in turn fitting into the upwardly opening outer housing 23. Inner case 52 can be secured into the outer housing 23 as desired.

Inner case 52 provides three wells 56, 58 and 60 for receiving the output modules 62, 64 and 66. Inner case 52 also provides a cut-out 68 arranged in alignment with switches 34 so that switches 34 protrude through cut-out 68 and are accessible to the user when the faceplate 24 becomes opened. Inner case 52 can be any insulating material desired, and in the preferred embodiment becomes a molded plastic part.

Electronics assembly 54 comprises a control logic module 70 sandwiched between an upper display module 72 and lower power supply module 74. The three modules become connected to each other and are fixed in position relative to each other by connector stakes such as connector stakes 76 and 78. Power supply module 74 carries upwardly directed connectors 80, 82 and 84 respectively aligned with the bottoms of the wells 56, 58 and 60 with connectors 80, 82 and 84 intended to connect to the bottoms of the output modules 62, 64 and 66. Control logic module 70 carries a connector 86 intended to mate with the connector 50 of the sensor module 42 after connector 50 passes through opening 48.

Display module 70 carries LED members 88 and 90 on the top surface thereof adjacent switches 34 and in alignment with window 30 of inner case 52 for producing the alpha-numeric output to the user.

In FIG. 4, output module 66, which is typical for an AC or DC switched output module, comprises an elongate rectangular case 92, a snap-fit cover 94, a circuit card assembly 96 carrying electronic components to be described and, if needed, a heat sink 98 formed of such as a piece of aluminum stock. Typically, the circuit card assembly 96 and heat sink 98 fit completely within the case 92 with the case being closed by snap-fit cover 94. A locating pin 100 extends from the bottom of case 92 to engage with a mating hole 102 in the power supply module 74 correctly to polarize the connection between the circuit card assembly 96 and the connector 84.

A 4-20 milliamp output module, represented in FIGS. 1 and 2 by output modules 62 and 64, is constructed and arranged in a manner similar to that of AC or DC output module 66 but has a circuit card assembly (not shown) extending substantially the width of two casings such as 92 and becomes enclosed in two adjacent casings and snap-fit covers.

Referring to FIG. 5, sensor module 42 comprises a sensing element 104 secured to a base plate 106. Sensing element 104 fits into opening 108 in rectangular housing 110, which also receives circuit card assembly 112 and is closed by cover piece 114. Circuit card assembly 112 connects to the sensing element 104 through wires 116 forming an input port to the circuit card assembly 112. Assembly 112 also carries connector 50 that extends into the cover piece 114 for connection to the electronics assembly 54. A temperature module presents a similar configuration of a circuit card assembly inside a housing and cover piece with suitable provisions for connection to a desired RTD, thermal sensor or J or K thermocouple sensing element.

In FIG. 6, a block diagram of the modules and electrical interconnection of the modules of the invention comprises block 42 representing the sensor module, block 70 representing the control module, block 72 representing the display module, block 66 representing an AC or DC switched output module, block 62, 64 representing a 4-20 milliamp analog output module and block 74 representing the power module. Sensor module 42 comprises the pressure sensor 104 connected thereto, an amplifier 120, a voltage reference 122 and a non-volatile memory 124. Amplifier 120 amplifies the low level analog signal received from the pressure sensor on leads 126 and provides an analog data signal on leads 128 to control module 70. Voltage reference 122 produces a DC voltage reference signal on leads 130 to the control module for use in the analog to digital conversion of the analog data signals on leads 128.

Non-volatile memory 124 contains calibration data obtained when the sensor module 42 became manufactured in the factory and tested against standard pressures and expected analog data signals on leads 128 and voltage reference signal on leads 130. Non-volatile memory also can contain other information that needs to be retained upon a loss of power in the device 20, such as the set point particular values, the over-range indicator and the over-range counter. Additionally, the calibration data in the non-volatile memory can be changed as desired by the control module 70, such as by writing a new zero-level calibration datum therein. Communication between non-volatile memory 124 and the control module occurs over leads 132.

Control module 70 comprises an analog to digital converter 134 and control logic 136. A to D converter 134 receives the amplified data signals on leads 128 and receives the voltage reference signals on leads 130 to produce a digital serial data signal on leads 138 representing the pressure experienced or sensed by pressure sensor 104. This digital serial data signal appearing on leads 138 is received by control logic 136 where it is processed as desired to produce desired output signals. A sensor interconnection 140 comprises the leads 128, 130 and 132 and associated connectors electrically and mechanically interconnecting the sensor module 42 with the control module 70.

AC or DC switched output module 66 comprises a driver 141 and an electronic switch 142 serially connected to plus and minus output leads 144 and 146. Output module 66 receives a discrete output from control logic 136 and control module 70 over leads 148. Control logic 136 thus simply indicates over leads 148 that the electronic switch 142 should make or break the contacts to the leads 144 and 146.

The 4-20 milliamp analog output module 62, 64 comprises a decoder 150, a driver 152 and a current controller 154 regulating a user-supplied current passing therethrough from plus output lead 156 to minus output lead 158. Analog output module 62, 64 receives a digital indication of the output level to be produced over leads 160 arranged to provide a parallel indication of the output value. Leads 160 extend from control logic 136 and the control module 70 to the analog output module 62, 64 and also to the display module 72.

Output interconnection 162 comprises the leads 148 extending from control module 70 to the switched output module 66 and the parallel leads 160 extending from the control module 70 to the analog output module 62, 64.

The display module 72 comprises the four switches 34, a decoder 164 and four single-digital LED displays 88a, 88b, 90a and 90b. Switches 34 indicate the making and breaking of their contacts to the control logic 136 over leads 166. Leads 160, previously described as carrying a parallel data representation of the pressure experienced by sensor 104, extend to the decoder 164. Decoder 164 in turn drives the four LED displays over leads 168.

Alternatively, sensor module 42 can be constructed and arranged to accept a temperature sensor 170 instead of pressure sensor 104, in which case the switch devise 20 will operate upon temperature sensing principles in response to the temperature experienced by temperature sensor 170.

In the overall scheme, switch device 20 provides a standard sensor interconnection 140 capable of connection to any one of several different and interchangeable temperature or pressure sensor modules with each sensor module being self-contained with all of the signals and calibration data required to make it look like any other sensor module. Thus different sensor modules of different range and of different type, such as temperature or pressure, can be substituted for a sensor module 42 as desired.

Output interconnection 162 likewise provides for connection to any desired switched or analog output module at the designated location in the switch device 20. The designated locations occur at the wells 56, 58 and 60 in the housing assembly. Thus the described AC or DC switched output modules can be substituted at well 60 as desired. Likewise any analog output module can be substituted at wells 56 and 58 as desired.

The control module 70 contains the analog to digital converter 134 and a control logic 136, formed of a programmed microprocessor as desired, to received standard signals from any sensor module and to produce standard output signals to any output module. The display module 72 generally is substantially permanently connected to the control module 70 to provide digital visual indication of temperatures or pressures experienced by sensing elements in a normal mode, and in a programming mode, to receive user inputs over the switches 34 and to provide visual programming information over the displays 88 and 90. Power module 74 generally connects to the modules as needed to provide electrical power.

In FIG. 7, blocks 172-190 represent the program steps of the main program loop of device 20. Control logic 136 follows this sequence of program steps on a continuous basis unless interrupted.

In FIG. 8, program steps 192 through 214 represent the sequence effected by control logic 136 upon being interrupted by a counter at 1.5 millisecond intervals to read the serial digital data from the analog to digital converter 134. Step 196 of throwing away bad readings functions to obtain one valid reading. This occurs as desired, such as by averaging four readings; taking the last of four rising or falling readings or y discarding previous readings that are more than 5% of the successive reading. Step 202 performs a transient discrimination by determining the slope of the most recent data value from the A to D converter 134. If the slope, or difference from the last data value is greater than substantially 60 psi per millisecond, the program skips block 204 and proceeds to block 206 so that the discrete output such as the AC or DC switched output module 66 receives no new data from the control logic 136. If the slope is less than approximately 60 psi per millisecond, program proceeds to block 204 so that the switched output module 66 receives new instructions on making and breaking its contact. In either event, the analog output module receives an update of the most recent sensed data signal.

In FIG. 9, the program flow chart blocks 216 through 282 represent the serial sequence of steps effected by control logic 136 when the switch device 20 has been placed into the programming mode. The programming mode substantially includes four submodes being a set mode (blocks 218, 260-282), a diagnostic mode (blocks 220, 252-258), a calibration mode (blocks 222-232) and a time delay mode (blocks 234-250).

FIG. 10 comprises the programming flow chart blocks 284-300 representing the sequence of steps effected by control logic 136 to perform a linearization calculation.

Figure 11:
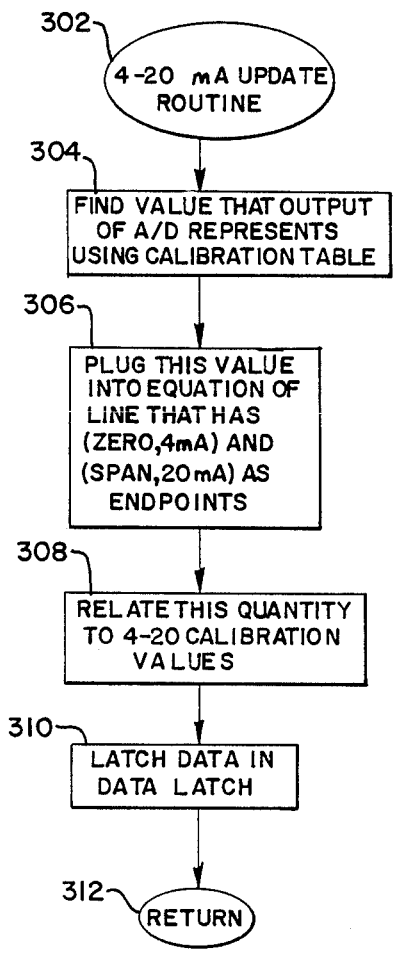
FIG. 11 is a flow chart of the 4-20 milliamp update routine.

In FIG. 11, program blocks 302 through 312 represent the sequence of steps effected by control logic 136 in updating the analog output module.

Because the labels of each of these program steps substantially describes the action being effected by the control logic 136, only minimal description of the processing has been provided. Each of these process steps and the totality of them readily can be implemented in any desired machine programming language.

In FIG. 8, after obtaining a valid data signal from the analog to digital converter, the control logic 136, according to process step blocks 198 and 200, test each data value to determine whether it is over the range of the sensor by comparing it to the maximum calibration datum from the non-volatile memory. If yes, control logic 136 increments an over-range counter and writes the incremented over-range to a storage location in the non-volatile memory means 124 in the sensor module 42. Referring also to FIG. 9, during the programming mode, the switch device 20 indicates the count of the over-range counter upon the command of the user by proceeding through process step blocks 252, 254 and 256. These steps become initiated after the user actuates the appropriate switch to show the number of over-range occurrences and that recalibration may be necessary.

In FIG. 9, the device recalibrates the sensor to a sense zero input level in process step blocks 222, 224 and 226. In those steps, the user places a zero load on the sensor and indicates to the device through the switches 34 that the sensor is to be recalibrated and that the sensor experiences a zero level load. The indication that the device is to be recalibrated occurs at process block 222. In steps 224 and 226, the control logic 136 determines whether the new zero level value from the sensing element remains within the certain percentage of the old zero level value and replaces the old zero level value with the new zero level value upon the new zero level value remaining within the certain percentage. Upon this occurring, control logic 136 indicates to the user through the displays 88 and 90 that the sensor can or cannot be recalibrated to zero by the device depending upon whether the new zero value is beyond or within a certain percentage of the old zero level value. This certain percentage typically is one percent.

In FIGS. 8 and 9, the process of effecting and making breaking of contacts is indicated at process step block 204 in FIG. 8 and blocks 260 through 272 in FIG. 9. In FIG. 9, the user enters the set point mode through process step block 218. In block 260 control logic 136 shows on the display 88, 90 the linearized calibrated particular values of the switch points for Output 1. The user can adjust those particular values up or down in block 262 as desired through switches 34 that binarily increment or decrement the content of the actual switch point register. Control logic 136 continuously converts the actual value selected by the user to calibrated values that will be displayed by the control logic 136. In step 264, the control logic 136 stores the actual values from the register in the sensor module at the non-volatile memory 124. Process step blocks 266 through 272 repeat substantially this processing of user-selected values for the second stage of the switched output module. These first and second stages provide separate and distinct set points at which the switched output module will respectively make and break contact between the user's wires.

After the user exits the programming mode and returns to the normal operating mode, in FIG. 8 at step 204, the control logic 136 compares the most recently obtained data signal from the sensor to the actual values retrieved from the non-volatile memory in the sensor module and indicates to the switched output module whether to change or maintain the making and breaking of contact between the user's electrical wires. The decisions to make and break contacts and to change or maintain the contact state are determined by comparing the received data signal to the actual values retrieved from the non-volatile memory and whether the data signals are moving in a direction down or up through the user-selected switch points.

Referring to FIG. 12, the AC output module 66-AC includes electronic driver circuitry 141-AC and electronic switch circuitry 142-AC. The user's electrical wires become connected to the switched output module 66-AC at pins 9 and 11 of connector J-20 and the signal input from control logic 136 appears at pin 3 at signal UPA. Driver 141-AC receives the low-level signal UPA and uses same to activate the electronic switch 142-AC to make or break contact through component Q12 between the connector terminals 9 and 11.

This and the other electronic circuits described herein are of standard design and with the component types and values indicated will readily effect the general functions desired. Of course, other circuit designs using varying and different components can be constructed and arranged to obtain the same functions.

In FIG. 13, the DC switched output module 66-DC includes the driver circuitry 141-DC and the electronic switch circuitry 142-DC. DC module 66-DC connects to the users electrical wires at pins 11, 9 and 7 of connector J-27 and receives the make or break control signal UPA at pin 3 thereof.

Figure 14:
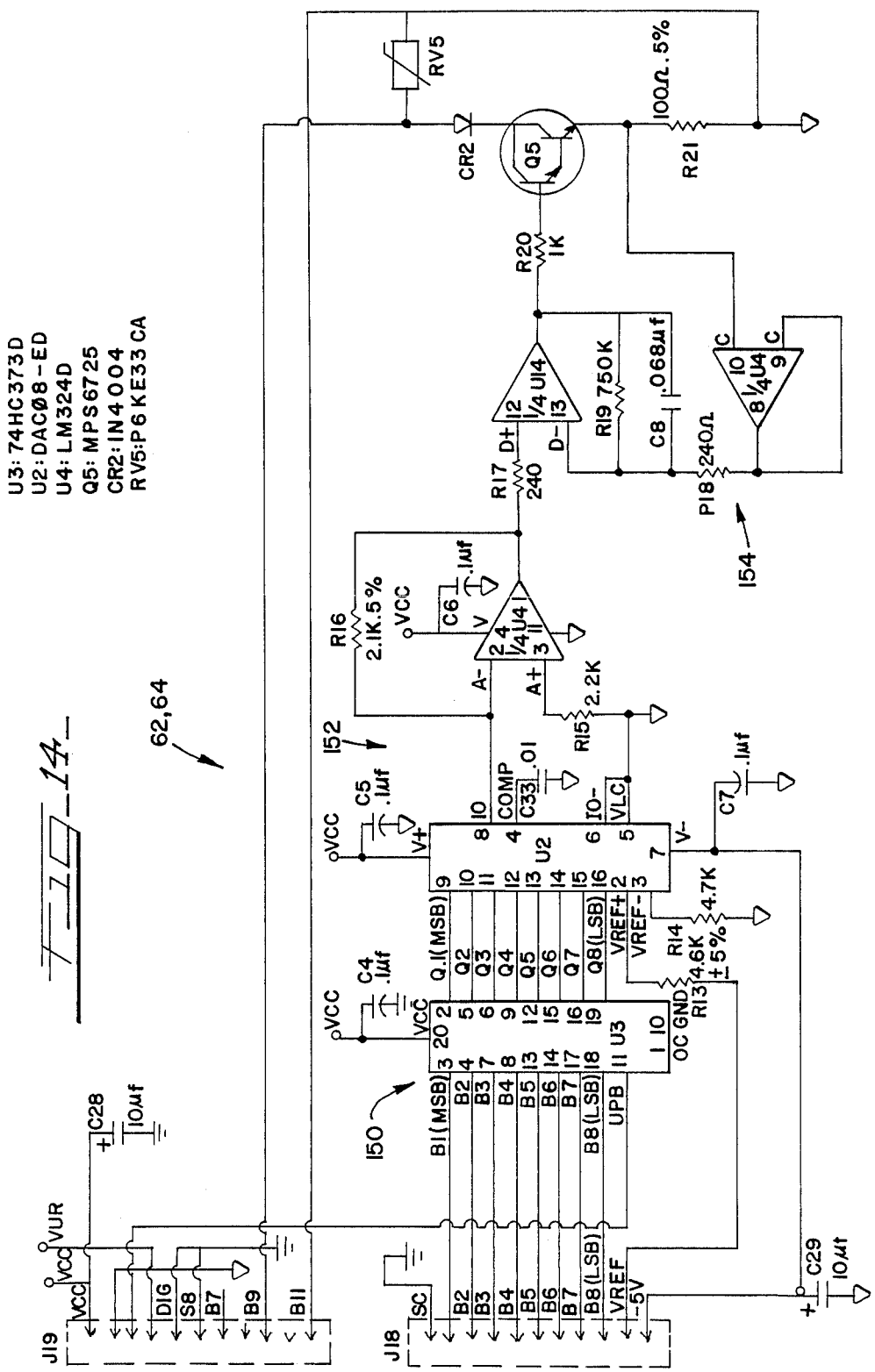
FIG. 14 is a schematic diagram of the electrical components contained in a 4-20 milliamp output module.

In FIG. 14, analog output module 62, 64 comprises electrical circuitry and components furnishing decoder 150, driver 152 and current controller 154. The users electrical wires become connected to pins 9 and 11 of connector J-19 and extend to transistor Q5. The leads B1 through B8 extending between connector J-18 and integrated circuit U3 present in parallel digital binary form the current level to be regulated through transistor Q5. Signal UPB from connector J-19, pin 3 to integrated circuit U3, pin 11 indicates that the parallel digital binary data has attained a valid state. Thereafter the decoder 150, driver 152 and current controller 154 operate on known principles to regulate the user-supplied current passing through transistor Q5 between connector J-19, pins 9 and 11.

Figure 15:
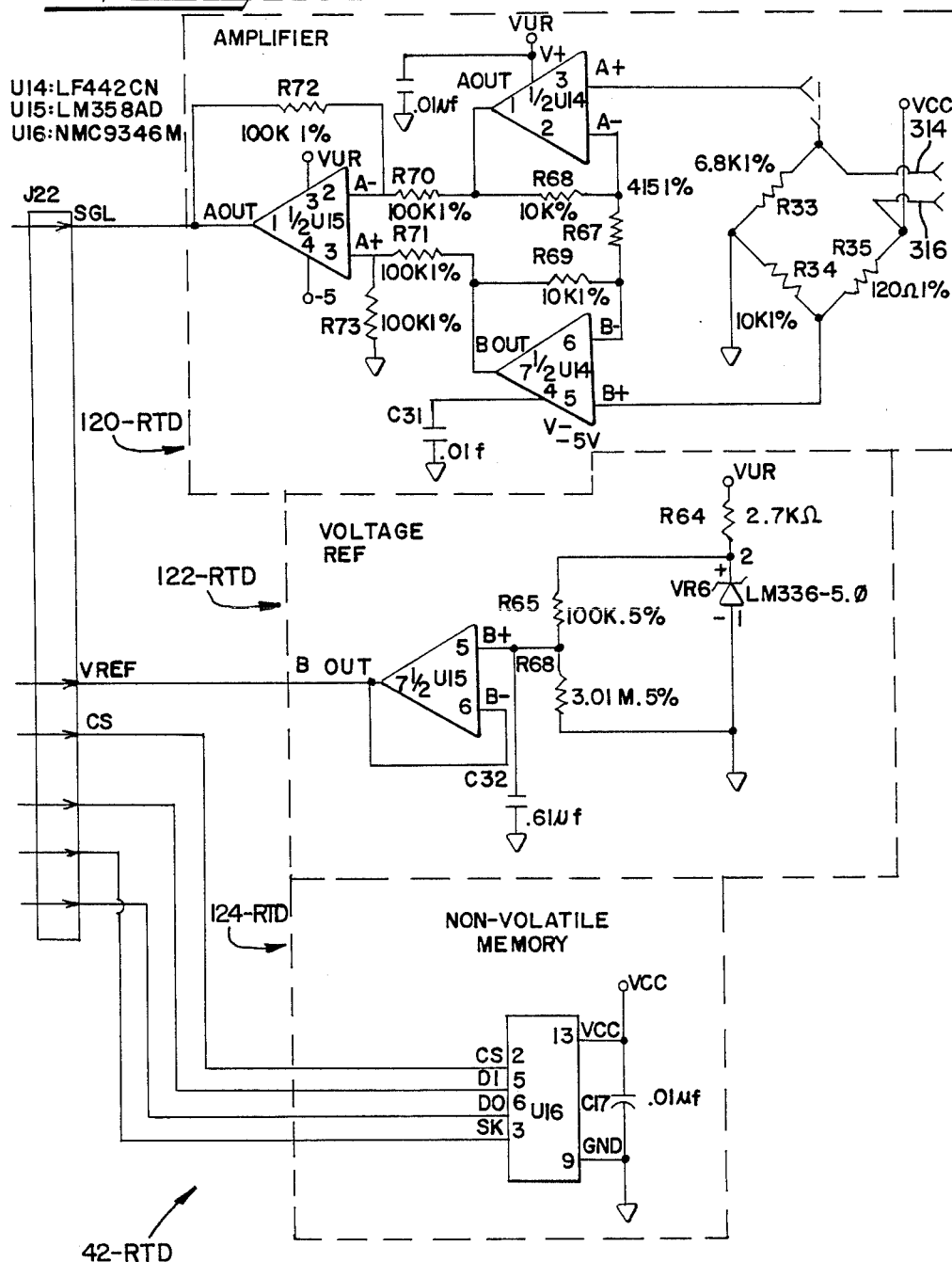
FIG. 15 is a schematic diagram of the electronic components contained in an RTD sensor module.

In FIG. 15, sensor module 42-RTD representing the electrical circuitry for an RTD-type temperature sensor comprises amplifier circuitry 120-RTD, voltage reference circuitry 122-RTD and nonvolatile memory circuitry 124-RTD. The RTD sensor connects to leads 314 and 316 in the amplifier 120-RTD to provide a low-level analog signal thereto. Amplifier circuitry 120-RTD increases the voltage and current levels of that analog signal to produce an analog data signal SGL to connector J-22.

The voltage reference circuit 122-RTD provides a signal V REF to connector J-22 representing the maximum voltage to be produced by the module 42-RTD in amplifying the low-level analog signal from the RTD sensor to produce the analog output SGL signal.

Four leads extend between the no-volatile memory 124-RTD and connector J-22. The lead CS is a chip-select signal indicating selection of that particular nonvolatile memory by the control logic 136. The DI and DO signal respectively carry serial digital input data and output data between the sensor module 42-RTD and the control logic 136. The signal SK is the clock signal indicating the bit timing for the serial data carried on the DI and DO leads.

Figure 16:
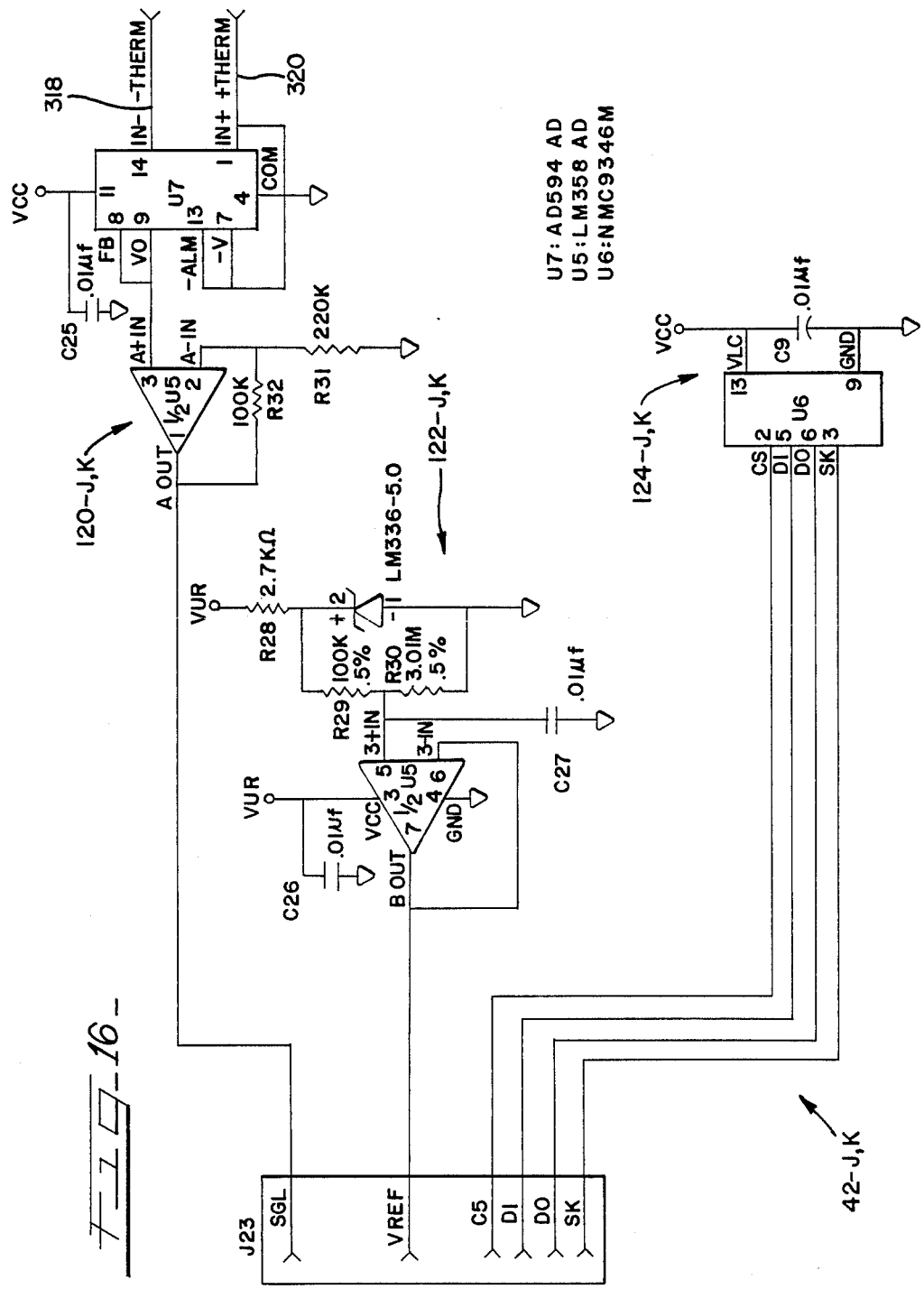
FIG. 16 is a schematic diagram of the electronic components contained in a J or K thermocouple sensor module.

In FIG. 16, the sensor module 42-J,K for a J or K-type thermocouple comprises connector J-23, amplifier 120-J,K, voltage reference 122-J,K and nonvolatile memory 124-J,K. Leads 318 and 320 connect the low-level analog signal from a J or K-type thermocouple to the amplifier circuitry 120-J,K, which in turn produces the analog output signal SGL to connector J-23. Voltage reference circuitry 122-J,K produces its voltage reference signal V REF to connector J-23. The nonvolatile memory 124-J,K connects to connector J-23 through the same leads previously described in connection with the sensor module 42-RTD.

Figure 17:
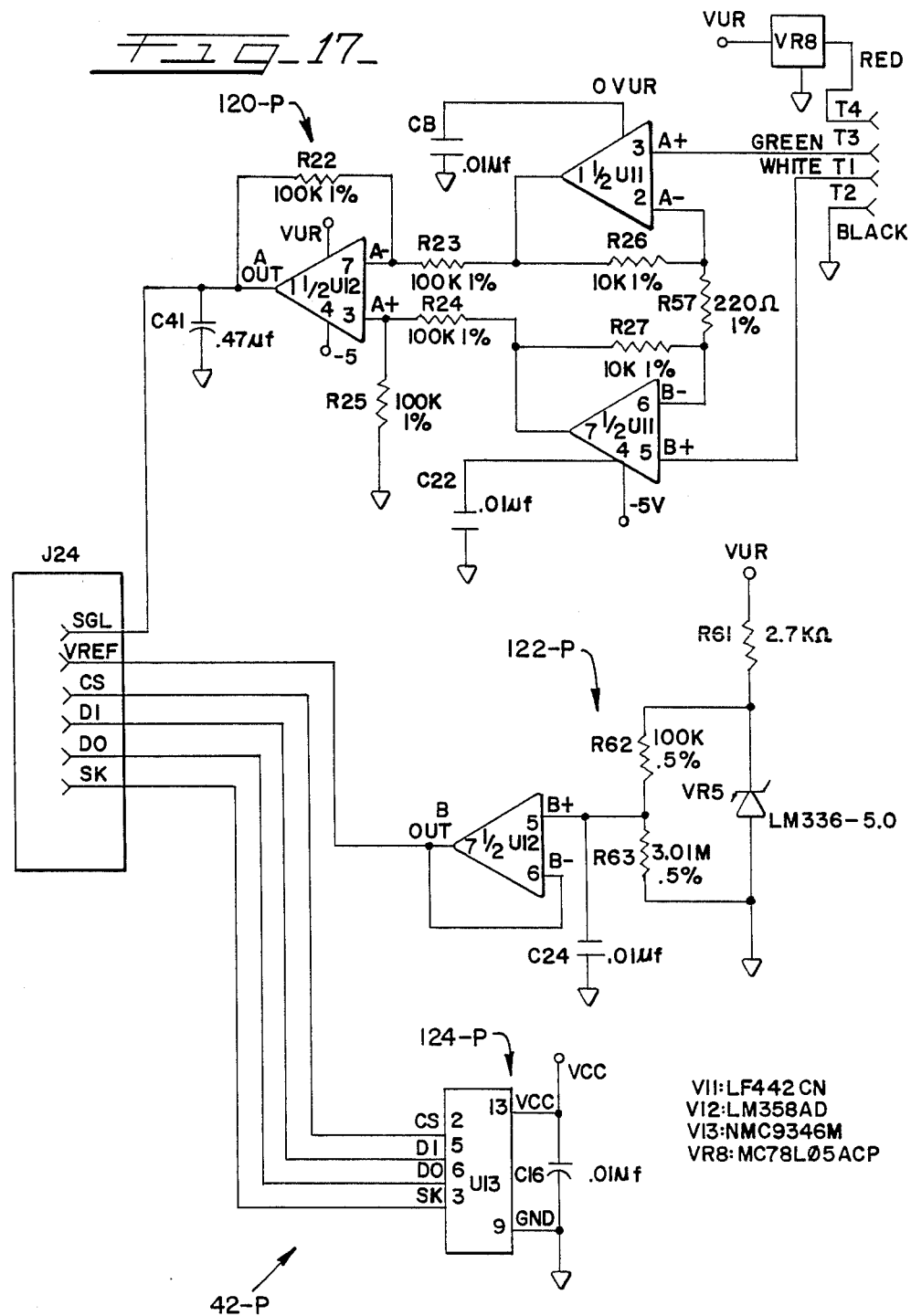
FIG. 17 is a schematic diagram of the electronic components contained in a pressure sensor module.

In FIG. 17, sensor module 42-P provides the electronic circuitry for a sensor module including a pressure sensing element. An amplifier circuitry 120-P connects to the pressure sensing element through leads T-1 through T-4 to produce the analog data signal SGL at connector J-24. Reference voltage circuitry 122-P and non-volatile memory 124-P produce signals similar to those previously discussed pertaining to the RTD and J or K-type thermocouples.

Figure 18:
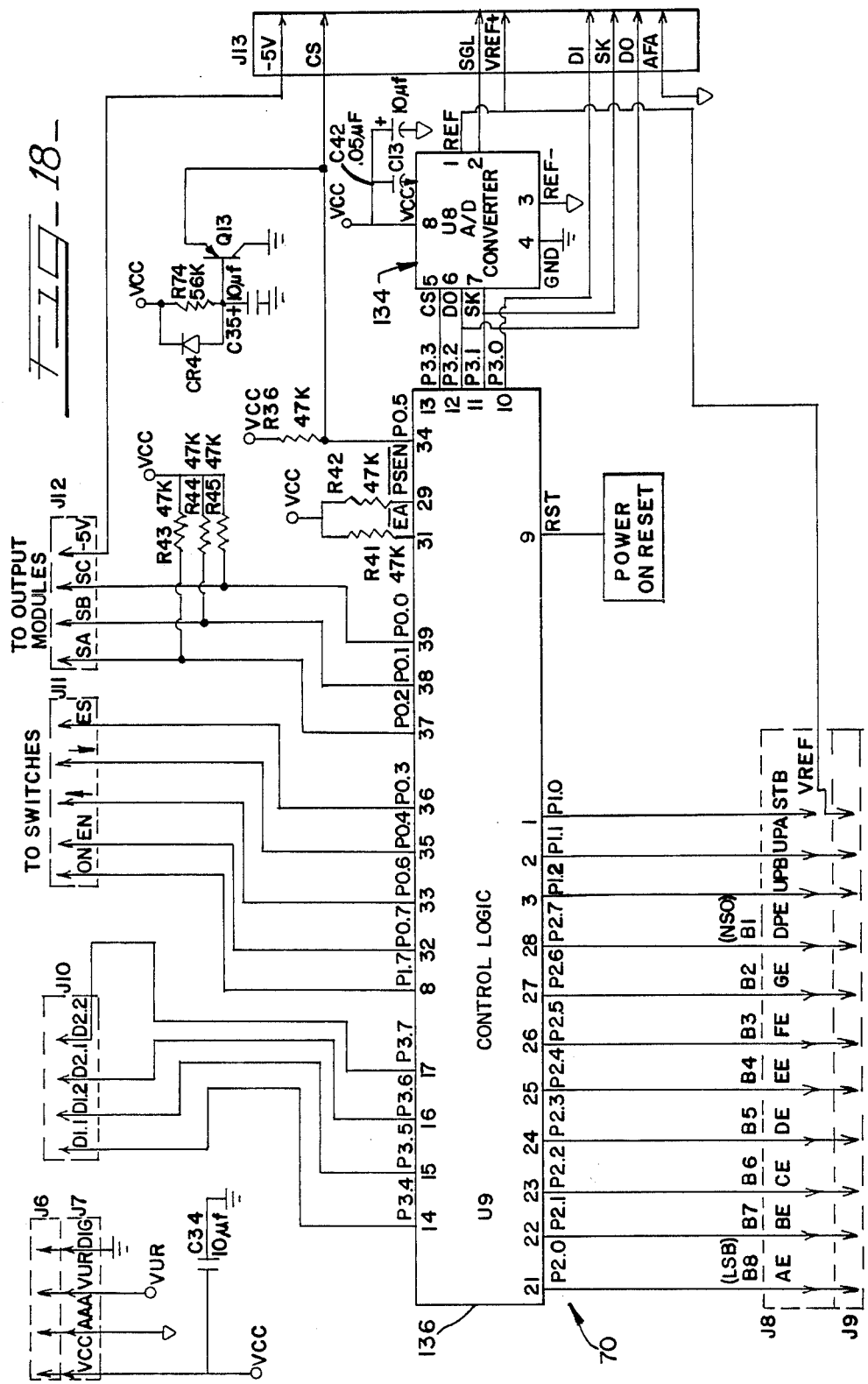
FIG. 18 is a schematic diagram of the electronic components contained in a control module.

In FIG. 18, control module 70 substantially comprises control logic 136 and A to D converter 134 together with peripheral and associated electronic components identified therein. Control module 70 receives the analog data signal SGL and the voltage reference signal V REF at connector J-13 and passes same to the A to D converter 134. The CS chip select, DI data in, DO data out, and SK clock signal also are received at connector J-13 and passed to the control logic 136. The serial digital representation of the sensed temperature or pressure value passes from the A to D converter 134 to the control logic 136 over the DO data out signal lead extending therebetween with a CS chip select and SK clock signal also extending therebetween.

The control logic 136 comprises an 87C51 microprocessor with serial data input and output leads and internal RAM/ROM memory circuits. The internal memory circuits contain the software control to effect the functions described herein for switch device 20. Leads extending from control logic 136 to connectors J-8 and J-9 carry the parallel digital binary representations and control signals to the display module 72 and to the analog output module 62, 64. The lead UPA extending from control logic 136 to connectors J-8 and J-9 also indicate to the switched output module 66 to change or maintain the making and breaking of contacts. The leads extending from control logic 136 to connector J-10 are used to enable each one of the four characters in the display module while the leads extending from connector J-11 to the control logic 136 carry the information from the switches 34.

The leads extending from control logic 136 to connector J-12 are each tied to a positive voltage through a resistor. Each of these leads SA, SB and SC extend to the connector for an output module, and when that output module is present in the switch device, it pulls that lead to ground, indicating to control logic 136 that particular output module is present for implementing the desired software features. The circuitry connected to transistor Q13 and to the CS chip select lead functions to disable the non-volatile memory on any one of the sensor modules during a power-up or down period.

Figure 19:
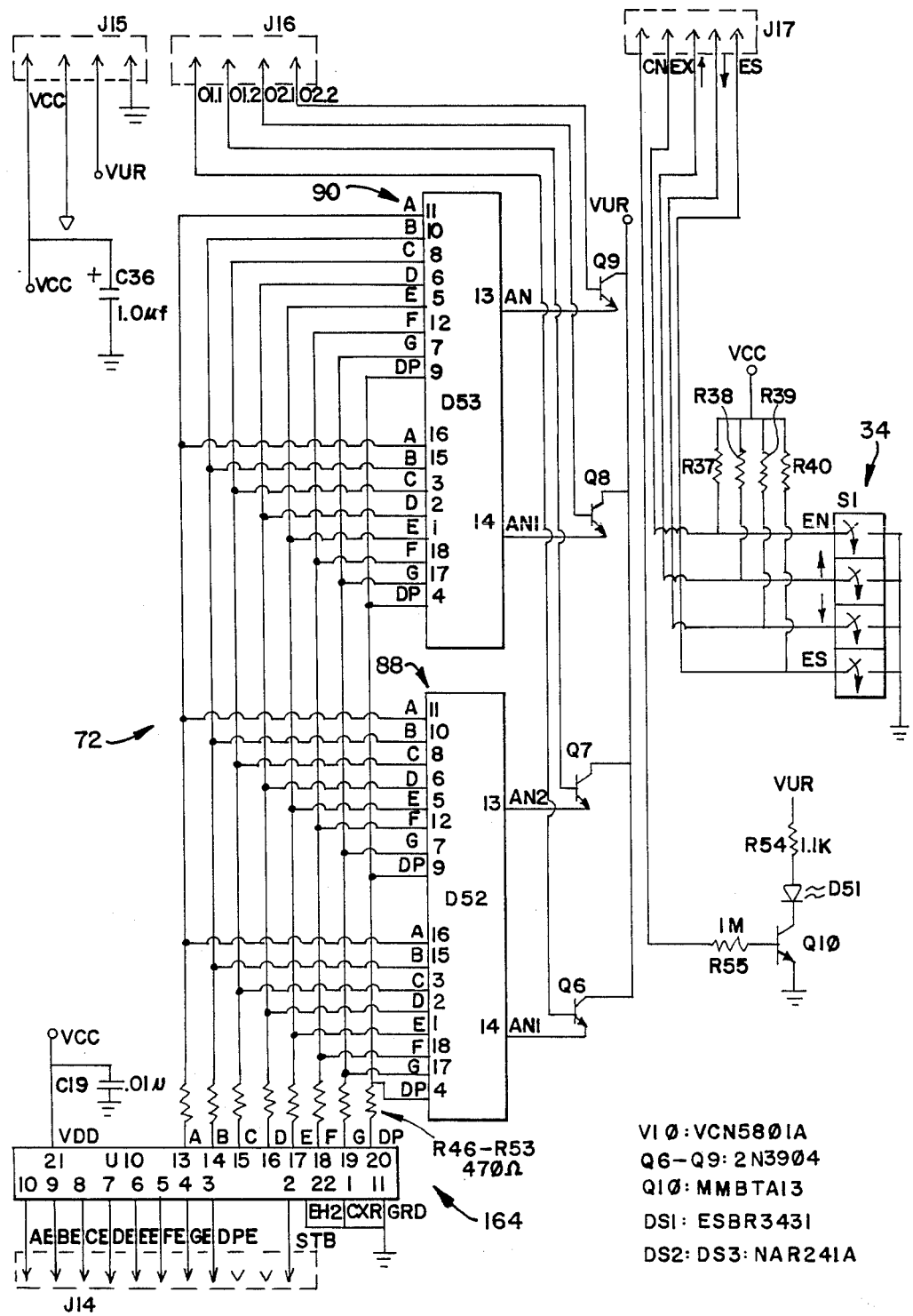
FIG. 19 is a schematic diagram of the electronic components contained in a display module.

In FIG. 19, decoder 164 receives the parallel digital binary information from the control logic 136 at connector J-14 and provides the necessary digital display indicator signals on leads A through G and DP to the display modules 88 and 90. Individual characters becomes selected and are multiplexed by way of digit select signals D1.1 through D2.2 received at connector J-16 from control logic 136 and passed to the display modules 88 and 90 through transistors Q6 through Q9. The signals from switches 34 extend to connector J-17 and therefrom to the control logic 136 while an LED indicator D-51 becomes energized from a signal also appearing at connector J-17.

The invention may be practiced other than as specifically shown. For example, other specific software steps and other specific electrical components can be used while remaining within the scope of the appended claims.

We claim:

1. A modular switch device adapted to be connected to a selected one of a pressure sensor or a temperature sensor, which modulate an electrical analog data signal to represent respective temperature or pressure values, and to a user's electrical wires at least for indicating particular pressure or temperature values selected by said user occurring at said selected sensor, said device comprising:
   A. a housing having an opening adapted to receive said electrical wires from said user, said housing also having a passage adapted for selected connection to said pressure and temperature sensor;
   B. at least one sensor module having an input port of signals and an output port of signals, said input port of signals being adapted for connection to said selected sensor and said sensor module further having an analog amplifier to amplify the analog data signal received from the sensor and to transmit same to said output port;
   C. a control module secured in said housing having at least one input port of electrical signals, at least one output port of electrical signals, A/D converter means for converting said amplified analog data signal received at said input port to a digital data signal, and control logic means for producing a witch signal to said output port when said digital data signal equals said particular values selected by said user;
   D. input connection means secured in said housing for connecting said output port of signals of said sensor module to said input port of signals of said control module;
   E. at least one output module having an input port of signals, a communications port of signals adapted to be connected to said user's electrical wires and electronic indicator means adapted for effecting said indication of particular pressure or temperature values at said user's wires in response to said switch signal produced by said control logic; and
   F. output connection means secured in said housing for connecting said output port of signals of said control module to said input port of signals of said output module.

2. The device of claim 1 in which said input connection means include leads that carry serial digital signals and analog signals.

3. The device of claim 1 in which said sensor module includes non-volatile memory means for retaining data upon lose of power and said memory means include data at least representing the calibration of said selected sensor and analog amplifier to a know standard.

4. The device of claim 1 in which said sensor module includes means for producing a reference voltage used by said A/D converter means for said converting.

5. The device of claim 1 i n which there is a different type of sensor module for each of a Resistance Temperature Detector, pressure, J thermocouple or K thermocouple sensor and each different type of sensor module includes identical output ports of signals.

6. The device of claim 1 in which said sensor module is readily removable from said switch device and input connection means.

7. The device of claim 1 including a display module carrying display means coupled to said control module for producing a visual display of the data represented by said amplified analog data signal.

8. The device of claim 7 in which said display module includes switch means coupled to said control module for inputting information to said control module.

9. The device of claim 1 in which said control logic means include process means for calibrating actual digital data received from said sensor to standard data.

10. The device of claim 1 in which there are plural different types of output modules providing for AC and DC electrical signal to pass through said user's electrical wires and each of said different types of output modules has identical input ports of signals.

11. The device of claim 1 in which said at least one output module is readily manually removable from said device and output connection means.

12. The device of claim 11 in which said housing includes at least one well receiving said at least one output module with said output connection means extending to the bottom of said well for engagement with said output module.

13. The device of claim 1 including an analog output module that includes analog means for producing an analog output signal representing the analog data signal received from said sensor.

14. The device of claim 1 in which there ar two output modules and one sensor module.

15. A modular switch device adapted to be connected to a selected one of a pressure sensor or a temperature sensor, which modulate an electrical analog data signal to represent respective temperature or pressure values, and to a user's electrical wires at least for indicating particular pressure or temperature values selected by said user occurring at said selected sensor by making and breaking connection between said users electrical wires, said device comprising:

A. a housing assembly furnishing a first outer housing open to the front and an inner case closing the front of said housing, said first housing and inner case furnishing an opening therethrough adapted to receive said electrical wires from said user, a passage therethrough for receiving a selected one of a pressure or temperature sensor module, and at least one well extending into said housing assembly for receiving at least one selected output module, said housing assembly including an electronics assembly contained within said housing and inner case, said electronics assembly including input connector means adjacent said passage for receiving from said sensor module an amplified analog data signal, control means for producing a switch signal of one and another state in response to said analog signal from said input connector means being above and below said user selected particular values, and output connector means located at the bottom of said wells for conveying said switch signal to said at least one output module;

B. said sensor module including a second housing and a sensor circuit card assembly therein, said sensor circuit card assembly including sensor connection means for electrical connection to said electrical analog data signal from said pressure or temperature sensor, amplifier means for producing an amplified analog data signal from said analog data signal and output connector means for conveying said amplified analog data signal to said input connector means of said electronics assembly, said sensor module also including fastener means cooperating with said housing assembly to fasten said sensor module to said housing assembly adjacent said passage; and C. said output module including a third housing, configured to conform to said well and be inserted therein, and an output circuit card assembly therein, said output circuit card assembly including output module connector means for receiving said switch signal from said output connector means of said electrical assembly and for connection to said user's electrical wires, said output circuit card assembly also including electronic switch component means for making and breaking contact between said user's electrical wires in response to said switch signal of said one and another state.

16. The switch device of claim 15 in which said sensor module fastens to the exterior of said first housing.

17. The switch device of claim 15 in which said wells are located in said inner case.

18. The switch device of claim 15 in which said sensor circuit card assembly includes voltage reference means producing a voltage reference signal indicating the maximum voltage produced by said amplifier means.

19. The switch device of claim 15 in which said sensor circuit card assembly includes memory means for storing calibration data of said sensor module.

20. The switch device of claim 15 in which said electronics assembly includes display means and switch means respectively for visually indicating data to a user and receiving instructions from a user.

21. The switch device of claim 15 in which said electronics assembly includes power supply means for supplying electrical power to said electronics assembly, sensor module and output module from electrical power supplied from said user's electrical wires.

22. A modular switch device adapted to be connected to a selected one of a pressure sensor or a temperature sensor, which modulate an electrical analog data signal to represent respective temperature or pressure values, and to a user's electrical wires at least for indicating particular pressure or temperature values selected by said user occurring at said selected sensor by making and breaking connection between said user's electrical wires, said device comprising:

A. a housing assembly including a first outer housing open to the front and an inner case closing said front, said outer housing furnishing an opening adapted to receive said electrical wires from said user and a passage for receiving a sensor module;

said inner case furnishing at least one well for receiving an output module;

B. a sensor module having a sensor housing fastened to the exterior of said first housing at said passage, said sensor module including sensor means interior of said sensor housing for producing an amplified analog data signal from said electrical analog data signal from said selected one pressure or temperature sensor, said sensor means including reference means for producing a voltage reference signal and memory means for storing actual values representing said user selected particular values and calibration data of said sensor means;

C. a control card assembly contained in said housing assembly including A/D converter means for producing digital data in response to said amplified analog data signal and voltage reference signal and control means for producing a switch signal of one and other state in response to comparing said digital data with said actual values and said calibration data, said control means including program means for interacting with a user;

D. a display card assembly contained in said housing assembly and electrically connected with said control card assembly, said display card assembly including display means readable by a user for visually indicating programming information to a user from said control means and including switch means for directing programming information from a user to said control means;

E. an output module having an output housing conformed to the shape of said well in said inner case and removably inserted in said well, said output module including output means interior of said output housing for making and breaking contact between said user's electrical wires in response to said one and another state of said switch signal from said control means and F. a power supply card assembly electrically connected to said control and display card assemblies in said housing assembly, said power supply card assembly including power supply means for supplying electrical power to said sensor module output module and control and display card assemblies.

* * * * *